(12) United States Patent
Gish et al.

(10) Patent No.: US 9,294,771 B2
(45) Date of Patent: *Mar. 22, 2016

(54) QUANTIZATION CONTROL FOR VARIABLE BIT DEPTH

(71) Applicant: Dolby Laboratories Licensing Corporation, San Francisco, CA (US)

(72) Inventors: Walter C. Gish, Oak Park, CA (US); Christopher J. Vogt, Laguna Niguel, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 214 days.

This patent is subject to a terminal disclaimer.

(21) Appl. No.: 14/093,852

(22) Filed: Dec. 2, 2013

(65) Prior Publication Data

US 2014/0086312 A1   Mar. 27, 2014

Related U.S. Application Data

(63) Continuation of application No. 14/017,618, filed on Sep. 4, 2013, now Pat. No. 8,615,041, which is a continuation of application No. 13/565,278, filed on Aug. 2, 2012, now Pat. No. 8,548,047, which is a continuation of application No. 13/216,836, filed on Aug. 24, 2011, now Pat. No. 8,259,795, which is a continuation of application No. 11/128,125, filed on May 11, 2005, now Pat. No. 8,045,614.

(60) Provisional application No. 60/573,017, filed on May 19, 2004.

(51) Int. Cl.
| H04N 19/124 | (2014.01) |
| H04N 19/126 | (2014.01) |
| H04N 19/61 | (2014.01) |
| H04N 19/184 | (2014.01) |

(52) U.S. Cl.
CPC ....... *H04N 19/124* (2014.11); *H04N 19/00096* (2013.01); *H04N 19/126* (2014.11); *H04N 19/184* (2014.11); *H04N 19/61* (2014.11)

(58) Field of Classification Search
None
See application file for complete search history.

(56) References Cited

U.S. PATENT DOCUMENTS

| 5,054,103 A | 10/1991 | Yasuda |
| 5,473,379 A | 12/1995 | Horne |

(Continued)

OTHER PUBLICATIONS

Gish, W. et al., "10-bit and 12-bit Sample Depth," Joint Video Team (JVT) of ISO/IEC MPEG & ITU-T VCEG, (ISO/IEC JTC1/SC29/WG11 and ITU-T SG 16 Q.6), 5.sup.th Meeting: Geneva, CH, Oct. 9-17, 2002.

(Continued)

*Primary Examiner* — Geepy Pe

(57) ABSTRACT

The quantization parameter QP is well-known in digital video compression as an indication of picture quality. Digital symbols representing a moving image are quantized with a quantizing step that is a function QSN of the quantization parameter QP, which function QSN has been normalized to the most significant bit of the bit depth of the digital symbols. As a result, the effect of a given QP is essentially independent of bit depth a particular QP value has a standard effect on image quality, regardless of bit depth. The invention is useful, for example, in encoding and decoding at different bit depths, to generate compatible, bitstreams having different bit depths, and to allow different bit depths for different components of a video signal by compressing each with the same fidelity (i.e., the same QP).

10 Claims, 5 Drawing Sheets

(56) References Cited

U.S. PATENT DOCUMENTS

| | | | |
|---|---|---|---|
| 6,044,176 | A | 3/2000 | Kim |
| 7,242,713 | B2 | 7/2007 | Srinivasan |
| 8,374,237 | B2 | 2/2013 | Demos |
| 2002/0005909 | A1 | 1/2002 | Sato |

OTHER PUBLICATIONS

"Draft Text of H.264/AVC Fidelity Range Extension Amendment", Joint Video Team (JVT) of ISO/IEC MPEG & ITU-T VCEG (ISO/IEC JCT1/SC29/WG11 and ITU-T SG16 Q.6), 11.sup.th meeting: Munich, DE, Mar. 15-19, 2004.

Draft ITU-T Recommendation and Final Draft International Standard of Joint Video Specification (ITU-T—Rec. H.264 ISO/IEC 14496-10 AVC), Joint Video Team (JVT) of ISO/IEC MPEG & ITU-T VCEG (ISO/IEC JTC1/SC29/WG11 and ITU-T SG16 Q.6), 8th Meeting: Geneva, Switzerland, May 23-27, 2003.

Schafer, R. et al. "The emerging H.264/AVC standard," EBU Technical Review, Jan. 2003 (12 pages).

Sullivan G. et al. "The H.264/AVC Advanced Video Coding Standard: Overview and Introduction to the Fidelity Range Extensions," presented at the SPIE Conference on Applications of Digital Image Processing XXVII, Special Session on Advances in the New Emerging Standard: H.264/AVC, Aug. 2004.

Gish, W. et al., "Extended Sample Depth: Implementation and Characterization," Joint Video Team (JVT) of ISO/IEC MPEG ITU-T VCEG, (ISO/IEC JTC1/SC29/WG11 and ITU-T SG 16 Q.6), 8.sup.th Meeting Geneva, Switzerland, May 23-27, 2003.

Richardson, Iain E.G. "H.264/MPEG-4 Part 10 White Paper: Overview of H.264," Jul. 10, 2002, published at www.vcodex.com.

Kennel, G. et al. "Gray-Scale Transformations of Digital Film Data for Display, Conversion and Film Recording," SMPTE Journal, Dec. 1993, pp. 1109-1119.

Malvar, H. et al. "YCoCg-R: A Color Space with RGB Reversibility and Low Dynamic Range," ISO/IEC JTC1/SC29/WG11 and ITU-T SG16 Q.6 document JVT-I014r3, Jul. 2003.

ITU-T, H.264, Series H: Audiovisual and Multimedia Systems—Infrastructure of Audiovisual Services—Coding of Moving Video "Advanced Video Coding for Generic Audiovisual Services" May 2003.

QUANTIZATION CONTROL FOR VARIABLE BIT DEPTH

This application is a continuation of, and claims the benefit of priority to, U.S. patent application Ser. No. 14/017,618 filed on Sep. 4, 2013, which is a continuation of U.S. patent application Ser. No. 13/565,278 filed on Aug. 2, 2012 (and issued as U.S. Pat. No. 8,548,047 on Oct. 1, 2013), which is a continuation of U.S. patent application Ser. No. 13/216,836 filed on Aug. 24, 2011 (and issued as U.S. Pat. No. 8,259,795 on Sep. 4, 2012), which is a continuation of U.S. patent application Ser. No. 11/128,125 filed on May 11, 2005 (and issued as U.S. Pat. No. 8,045,614 on Oct. 25, 2011), which claims the benefit of the filing date of U.S. Provisional Patent Application Ser. No. 60/573,017 filed on May 19, 2004, all of which are hereby incorporated by reference in their entirety.

FIELD OF THE INVENTION

This invention relates to digital methods for data compressing moving images, and, in particular, to lossy methods that utilize quantization to control the balance between the degree of compression and the fidelity of the compressed result. The invention includes not only methods but also corresponding computer program implementations and apparatus implementations.

BACKGROUND OF THE INVENTION

A digital representation of still or video images consists of spatial samples of image intensity and/or color quantized to some particular bit depth. This bit depth is typically dependent upon the devices used to capture and display the still or video images. The dominant bit depth for still and video images has been 8 bits. This provides reasonable image quality and each sample fits perfectly into a single byte of digital memory.

Consequently, almost all image and video compression systems have been limited to 8-bit samples. For example, JPEG is specified only for 8-bit samples of R/G/B and MPEG-2 is specified only for 8-bit samples of Y/U/V. However, 8 bits is certainly not the limit imposed by human vision, and many applications require more fidelity than 8-bit samples can provide. For the case of images captured on film, professional scanners use 10-12 bits in approximately logarithmic units or roughly 14-16 bits linear. Professional video systems routinely require 10-bit data formats. Furthermore, an evolution to bit depths greater than 8 bits is coming to consumers in general. The next version of Microsoft's operating system, code-named Longhorn, is expected to have a new 10-bit per component display interface. In addition, modern compression techniques, such as JPEG2000 and H.264 are more efficient and have fewer artifacts than their predecessors. This makes them capable of compressing higher quality images without artifacts that would negate the benefits of greater bit depths. Also, the ever-increasing bandwidth of wireless and wired networks allows transporting video of larger format and higher quality. Taken together, this means that compression at higher quality levels is efficient enough to be practical. Thus, there is an emerging need for compression systems that operate with samples whose bit depth is greater than 8 bits.

Such greater bit depths allow higher fidelity in the overall compression. The fidelity of a compressed image is measured by the distortion, which is the mean-squared error (MSE) between the original image or frame and the reconstructed (compressed) image or frame normalized to the maximum possible (peak) amplitude and measured in logarithmic units. In short, the distortion PSNR (Peak Signal-to-Noise Ratio) in dB is $$PSNR = 10 \log(peak^2/MSE) \quad (1)$$

Greater bit depths permit higher values for PSNR. For example, the quantization error for N-bit sampling is commonly modeled as independent, uniformly distributed random noise over the interval $[-\frac{1}{2}, \frac{1}{2}]$ so that the MSE is $\frac{1}{12}$ with respect to the least significant bit. Since the input samples are integers in the range $[0, 2^N-1]$, the peak value is $2^N-1$. The PSNR corresponding to this MSE is $$PSNR = 10 \log((2^N-1)^2/(\frac{1}{12})) \quad (2)$$

Since this represents the error between the original, unquantized image and its quantized representation, it represents an upper bound for the fidelity of the compressed result compared to the original image. Table 1 shows this upper bound for some representative bit depths:

TABLE 1

Maximum PSNR as a function of bit depth

| bit depth (bits) | PSNR limit (dB) (due to round-off) |
|---|---|
| 8 | 58.92 |
| 10 | 70.99 |
| 12 | 83.04 |
| 14 | 95.08 |
| 16 | 107.12 |

All lossy compression systems, such as the example schematically shown in FIG. 1, incur some form of a trade-off between the degree of compression (the number of compressed bits in the case of a still image and the bit rate in the case of moving images) and the fidelity. This performance is formally characterized by a "rate-distortion" (R-D) curve. This curve is a graph of the distortion (in PSNR) as a function of the bits or bit rate required for the compressed representation (typically in Kbytes for images and Mbits/sec for moving images or video). FIG. 5 shows an example of a typical R-D curve. Rate-distortion curves show how well a particular compression-decompression system, or "codec," performs over a range of compression ratios or bit rates for a particular input image or video sequence.

FIG. 1 shows schematically a generic prior art image compression/decompression system in which an original image is applied to an Encoder 2. The encoder's compressed bits output are applied to a Decoder 4 that produces a decompressed version of the image. The original image is compared to the decompressed image in a PSNR calculation 6 to provide the PSNR.

The method used to control where along the rate-distortion curve a compression system operates is through the use of a quantization parameter, or QP, to control quantization as indicated in FIGS. 4 and 5, which figures are described further below. The parameter QP determines the quantization stepsize, QS, which is then directly used in quantization and dequantization functions or devices. The most general interpretation is that an integer QP is used to index a table of values for QS. Such a table contains a mapping from QP to QS. Thus, in FIG. 4, which shows schematically a generic prior art quantization and dequantization system, the quantization parameter QP is applied to a first mapping function 10 that generates a corresponding quantization step-size QS in accordance with predetermined mapping relationships. The same QP value is also applied to a second mapping function 12 that generates the same corresponding quantization step-size QS in accordance with the same predetermined mapping relationships. The quantization step-size QS produced by mapping function 10 controls the step size of quantizer 14 that receives an N-bit data word X. Quantizer 14 produces a quantized data word Q having a bit length that is a function of N, the quantization parameter QP, and the quantization step-size QS. Dequantizer 16 receives the quantized data word Q along with QS and produces a dequantized N-bit data word X' that approximates the input N-bit data word X.

FIG. 5, shows a rate-distortion curve (distortion PSNR versus bit rate as QP is varied) for a hypothetical codec that employs both an identity mapping (QP=QS), such as that employed in prior art MPEG-1, MPEG-2 and MPEG-4 systems, and an exponential mapping, such as that employed in the H.264 system ($QS=2^{QP/6-L}$). The distribution of quantization parameters QP is shown along the curve. The QP values above the curve are those for the identity mapping and the QP values below the curve are those for the exponential mapping. For identity mapping, low values of QP (indicating higher quality coding) are relatively sparse, becoming denser for high values of QP (lower quality coding). For exponential mapping, more values of QP are available for low values of QP and the distribution of QP values is more uniform than for the identity mapping.

FIG. 2 and FIG. 3 show block diagrams for an H.264 encoder and decoder, respectively. H.264, also known as MPEG-4/AVC, is considered the state-of-the-art in modern video coding. Although H.264 possesses many of the features common to previous MPEG (ISO) and ITU video codecs, it has many innovations. Although aspects of the present invention are usable in MPEG-1, MPEG-2 and MPEG-4 coding environments, aspects of the present invention may be used with particular advantage in H.264 coding environments. Details of H.264 coding are set forth in "Draft ITU-T Recommendation and Final Draft International Standard of Joint Video Specification (ITU-T Rec. H.264|ISO/IEC 14496-10 AVC)," Joint Video Team (JVT) of ISO/IEC MPEG & ITU-T VCEG (ISO/IEC JTC1/SC29/WG11 and ITU-T SG16 Q.6), 8$^{th}$ Meeting: Geneva, Switzerland, 23-27 May, 2003. Details of the "Fidelity Range Extensions" to the basic H.264 specifications are set forth in "Draft Text of H.264/AVC Fidelity Range Extensions Amendment," Joint Video Team (JVT) of ISO/IEC MPEG & ITU-T VCEG (ISO/IEC JTC1/SC29/ WG11 and ITU-T SG16 Q.6), 11$^{th}$ Meeting: Munich, Del., 15-19 Mar., 2004. Both of the just-identified documents are hereby incorporated by reference in their entireties. The "Fidelity Range Extensions" will support higher-fidelity video coding by supporting increased sample accuracy, including 10-bit and 12-bit coding. Aspects of the present invention are particularly useful in connection with the implementation of such increased sample accuracy. Further details regarding the H.264 standard and its implementation may be found in various published literature, including, for example, "The emerging H.264/AVC standard," by Ralf Schäfer et al, *EBU Technical Review*, January 2003 (12 pages) and "H.264/ MPEG-4 Part 10 White Paper: Overview of H.264," by Iain E G Richardson, Jul. 10, 2002, published at www.vcodex.com. Said Schäfer et al and Richardson publications are also incorporated by reference herein in their entirety.

The H.264 encoder shown in FIG. 2 has elements now common in video coders: transform and quantization methods, entropy (lossless) coding, motion estimation (ME) and motion compensation (MC), and a buffer to store reconstructed frames. H.264 differs from previous codecs in a number of ways: an in-loop deblocking filter, many modes for intra-prediction, a new integer transform, two modes of entropy coding (variable length codes, and arithmetic coding), motion block sizes down to 4×4 pels, and so on. Of particular importance here is that H.264 has a different distribution of quantization step-sizes that makes its extension to higher bit depths more efficient than MPEG-2, for example. The outlined portion of FIG. 2 relates to the description of FIG. 7a, below.

The H.264 decoder shown in FIG. 3 can be readily seen as a subset of the encoder. The new quantization methods forming aspects of the present invention apply to both the decoder and the encoder. The outlined portion of FIG. 3 relates to the description of FIG. 7b, below.

All lossy image and video compression systems, including H.264 and all the other JPEG/MPEG/ITU standards, use quantization as the primary means to control the degree of compression, and hence the fidelity of the result. In other words, the degree of quantization used determines the operating point along the rate-distortion curve. This may be seen, for example, in FIG. 5.

The most common form of quantization is uniform (linear) quantization. MPEG-2 employs uniform quantization. In uniform quantization the quantized value is the original value scaled by a quantization step size (whose inverse is called the quantization resolution), QS, and converted to an integer $$Q=\text{int}[X/QS+r] \quad (3)$$

where X is the continuous variable to be quantized, Q is the quantized value, and r is an optional rounding parameter in the interval [0,1). If r is 0, the quotient is truncated. If r is ½, the result corresponds to simple rounding. Other values of r are possible and useful. The corresponding dequantized value is $$X'=Q\times QS+s \quad (4)$$

where s is another rounding parameter, so that X' is the quantized approximation to X. As described above, FIG. 4 shows this prior art in quantization and dequantization. Note that the number of bits used for the input, X, and the number of bits for the output, X', are the same and there is a single quantization step-size, QS.

As discussed above, the method used to control where along the rate-distortion curve a compression system operates is through the use of a quantization parameter, or QP, to control quantization as indicated in FIGS. 4 and 5. The parameter QP determines the quantization step-size, QS, which is then directly used in the quantization and dequantization equations 3 and 4 (above). The most general interpretation is that an integer QP is used to index a table of values for QS. This table contains the mapping from QP to QS. There are two common mappings from QP to QS: an identity mapping (used in MPEG-2 and other standards)

$$QS=QP \quad (5)$$

and an exponential mapping $$QS=2^{QP/6-L} \quad (6)$$

which is used in H.264 (the value of L differs for quantizing luma versus chroma in this standard). Note that the quantization step-size is an integer for the identity mapping, while for the exponential mapping it is a floating-point number approximated by an integer. More precisely, in H.264, QS is represented by one of six integers, $\{2^M, 2^{M+1/6}, \ldots, 2^{M+5/6}\}$, for some value of M plus a number of shifts necessary to account for the difference between M and the integer portion of (QP/6) and L.

The identity and exponential mappings distribute quantization step-sizes very differently. The identity mapping is sparse for low QP values, but dense for high QP values, as indicated in FIG. 5. In contrast, the density of QP values for H.264 is more uniform. Table 2 compares these two mappings for each factor of two (octave) in quantization step-size. "QS#" is the number of quantization step sizes in the octave. This information may also be seen in FIG. 5. As shown in the table and in the figure, QP values of 1, 2, 4, 8, 16 and 32 for identity mapping correspond, respectively, to QP values of 0, 6, 12, 18, 24 and 30 for exponential mapping.

TABLE 2

Distribution of quantization step-sizes

| Octave | Identity Mapping QS# {QP values} | Exponential Mapping QS# {QP values} |
|---|---|---|
| 1 | 1 {1} | 6 {0-5} |
| 2 | 2 {2-3} | 6 {6-11} |
| 3 | 4 {4-7} | 6 {12-17} |
| 4 | 8 {8-15} | 6 {18-23} |
| 5 | 16 {16-31} | 6 (24-29) |
| 6 | 1 {32} | 6 {30-35} |
| 7 | — | 6 {36-41} |
| 8 | — | 6 {42-47} |
| 9 | — | 5 {48-52} |

The exponential mapping has the same density of quantization step-sizes for each octave. FIG. 5 shows how these two compare for a hypothetical rate-distortion plot ("hypothetical" in the sense that no existing codec is known to use both mappings). As mentioned above, the identity mapping is relatively sparse for low QPs, and very dense for high QPs, while the exponential mapping is relatively uniform for all QPs. As discussed further below, this makes the extension of quantization to higher bit depth much more efficient for H.264 with its exponential mapping than with the identity mapping of MPEG-2.

The prior art does nothing to normalize the effects of varying bit depth when performing quantization and dequantization operations. That is, the prior art simply uses equation (3) with equations (5) or (6) for quantization, and equation (4) for dequantization, without any modification for bit depth. This was the approach taken in the MPEG-4 N-Bit and Studio video compression profiles, which were designed to encode bit depths of up to 12 bits. However, because no changes were made to the quantization and dequantization methods when bit depth changes, the same value for QP produces different values for PSNR at different bit depths. What causes this is discussed below in connection with prior art quantization methods (and Table 3). At this point, the effects are set forth.

Suppose that for the MPEG-2 N-Bit profile a particular value of QP results in a PSNR of 40 dB at an 8-bit encoding depth; at a 10-bit encoding depth the same QP will result in a PSNR of roughly 52 dB. This change in PSNR reflects underlying differences in the coded bitstream—the number of bits in each quantized word in the bitstream is greater in the case of the 10-bit encoding depth. In order to have the same PSNR and the same quantized word lengths in the bitstream, the 10-bit QP would have to be four times as large. These differences make it more difficult to design encoders and decoders that can handle different bit depths, even though the 8-bit compression at QP and the 10-bit compression at 4 times that QP produce nearly identical compressed data—the quantized word lengths are the same but the underlying data represented by them may differ by a rounding difference. Thus, for a given QP value, the syntax and semantics of the bitstream produced by current encoders is not compatible for different bit depths. It would be advantageous to standardize QP parameters and quantized values among different bit depths. For the prior art, a compressed bitstream generated from 10-bit data using a 10-bit encoder will not play on current 8-bit decoders because QP and all the quantized values mean different things at different bit depths.

SUMMARY OF THE INVENTION

In a first aspect, the invention provides a method for digital encoding and decoding, comprising (1) processing digital symbols representing a moving image, each symbol S having a bit depth N, to provide intermediate variables X, each having a bit depth N+K, where K is a function of the processing, (2) quantizing each intermediate variable X with a quantizing step size $QS_N$ to produce a quantized data word Q, wherein $QS_N$ is a function of a quantization parameter QP, which function has been normalized to the most significant bit of the N-bit bit depth, (3) processing, including entropy coding, the quantized data words Q to provide an encoded bitstream, (4) processing, including entropy decoding, the encoded bitstream, to provide quantized data words Q, (5) dequantizing each quantized data word Q with a dequantization step size $QS_M$ to produce a dequantized intermediate (M+K)-bit variable X' that approximates the intermediate (N+K)-bit variable X, wherein $QS_M$ is the same function of the quantization parameter QP as is $QS_N$ but has been normalized to the most significant bit of an M-bit bit depth, and (6) processing the intermediate variables X' to produce digital symbols, each symbol S' having a bit depth M, representing an approximation of the moving image.

In another aspect, the invention provides for a method for producing an encoded bitstream in response to digital symbols representing a moving image, comprising (1) processing the digital symbols, each symbol S having a bit depth N, to provide intermediate variables X, each having a bit depth N+K, where K is a function of the processing, (2) quantizing each intermediate variable X with a quantizing step size $QS_N$ to produce a quantized data word Q, wherein $QS_N$ is a function of a quantization parameter QP, which function has been normalized to the most significant bit of the N-bit bit depth, and (3) processing, including entropy coding, the quantized data words Q to provide an encoded bitstream having the same syntax and semantics for a given quantization parameter QP regardless of the bit depth N.

In a further aspect, the invention provides for another method for producing an encoded bitstream in response to digital symbols representing a moving image, comprising (1) processing the digital symbols, each symbol S having a bit depth N, to provide intermediate variables X, each having a bit depth N+K, where K is a function of the processing, (2) quantizing each intermediate variable X with a quantizing step size $QS_N$ to produce a quantized data word Q, wherein $QS_N$ is a function of a quantization parameter QP, which function has been normalized to the most significant bit of the N-bit bit depth, and (3) processing, including entropy coding, the quantized data words Q to provide an encoded bitstream wherein the portions of the bitstream representing the quantized data words Q are substantially identical for a given quantization parameter QP regardless of the bit depth N, differing by rounding errors between respective ones of the intermediate variables X and the quantized data words Q for different bit depths N.

In yet another aspect, the invention provides for a method for digital encoding, comprising processing digital symbols representing a moving image, each symbol S having a bit depth N, to provide intermediate variables X, each having a bit depth N+K, where K is a function of the processing, and quantizing each intermediate variable X with a quantizing step size $QS_N$ to produce a quantized data word Q, wherein $QS_N$ is a function of a quantization parameter QP, which function has been normalized to the most significant bit of the N-bit bit depth.

In yet a further aspect, the invention provides for a method for digital encoding and decoding, comprising (1) processing digital symbols representing a moving image, each symbol S having a bit depth Nc, where Nc is a function of the color component c, where c represents one of the color components RGB or YUV or equivalent, to provide intermediate variables Xc, each having a bit depth Nc+K, where K is a function of the processing, (2) quantizing each intermediate variable Xc with a quantizing step size $QS_{Nc}$ to produce a quantized data word Qc, wherein $QS_{Nc}$ is a function of a quantization parameter QP, which function has been normalized to the most significant bit of the Nc-bit bit depth, (3) processing, including entropy coding, the quantized data words Qc to provide an encoded bitstream, (4) processing, including entropy decoding, the encoded bitstream, to provide quantized data words Qc, (5) dequantizing each quantized data word Qc with a dequantization step size $QS_{Mc}$ to produce a dequantized intermediate (Mc+K)-bit variable Xc' that approximates the intermediate (Nc+K)-bit variable Xc, where Mc is also a function of the color component c, wherein $QS_{Mc}$ is the same function of the quantization parameter QP as is $QS_{Nc}$ but has been normalized to the most significant bit of an Mc-bit bit depth, and (6) processing the intermediate variables Xc' to produce digital symbols, each symbol S' having a bit depth Mc, representing an approximation of the moving image.

In still another aspect, the invention provides for a method for decoding a bitstream wherein the bitstream was generated by processing digital symbols representing a moving image, each symbol S having a bit depth N, to provide intermediate variables X, each having a bit depth N+K, where K is a function of the processing; quantizing each intermediate variable X with a quantizing step size $QS_N$ to produce a quantized data word Q, wherein $QS_N$ is a function of a quantization parameter QP, which function has been normalized to the most significant bit of the N-bit bit depth; and processing, including entropy coding, the quantized data words Q to provide an encoded bitstream, comprising (1) processing, including entropy decoding, the encoded bitstream, to provide quantized data words Q, (2) dequantizing each quantized data word Q with a dequantization step size $QS_M$ to produce a dequantized intermediate (M+K)-bit variable X' that approximates the intermediate (N+K)-bit variable X, wherein $QS_M$ is the same function of the quantization parameter QP as is $QS_N$ but has been normalized to the most significant bit of an M-bit bit depth, and (3) processing the intermediate variables X' to produce digital symbols, each symbol S' having a bit depth M, representing an approximation of the moving image.

Other aspects of the invention include apparatus adapted to perform the methods of any one of the aspects of the invention just described and computer programs, stored on a computer-readable medium for causing a computer to perform the methods of any one of the aspects of the invention just described.

Aspects of the present invention provide for uniform bitstream syntax and semantics, independent of the bit depth.

Another aspect of the present invention is that the effect of a given QP should be essentially independent of bit depth. In other words, a particular QP value should have a standard effect on image quality, regardless of bit depth. This may be referred to as "QP invariance" and it may be achieved by normalizing the quantization step-size QS to the most significant bit of the bit depth of the variable being quantized. By doing nothing different as bit depth changes, previous image processing methods normalize the quantization step-size to the least significant bit of the bit depth of the variable being quantized.

Once the effects of QP are standardized with respect to the bit depths of the input samples, it is easier to allow the bit depth of individual color components to be different from each other. Formats with different bit depths for different color components are quite common, often a result of the sensitivity of human vision to different colors. For example, the 5/6/5 RGB format uses 5 bits for Red, 6 bits for Green, and 5 bits for Blue, which fits exactly into a 16-bit word and represents the important green color with higher fidelity. If one attempts to use such color formats with existing compression systems, it would compress the different color components with vastly differing fidelity. This could be remedied by adding separate QP parameters for each component, for example $QP_R$, $QP_G$, $QP_B$. However, current standards for video compression do not allow this. This invention facilitates the native compression and decompression for these color formats that have unequal bit depths. Formats with unequal bit depths can also arise from color space transformations. Malvar and Sullivan have described a lifting-based transformation between RGB at N/N/N bits and YCoCg at N/N+1/N+1 bits, which is exactly invertible using integer arithmetic. H. Malvar and G. Sullivan, "YCoCg-R: A Color Space with RGB Reversibility and Low Dynamic Range,"," ISO/IEC JTC1/SC29/WG11 and ITU-T SG16 Q.6 document JVT-I014r3, July 2003. Thus, the ability to code YCoCg at unequal bit depths allows the indirect coding of N-bit RGB data without any fidelity loss from the color space transformation. Thus, it is a further aspect of the invention to allow different bit depths for different components of a video signal and to compress each with the same fidelity (i.e., the same QP).

It is a further aspect of the present invention to produce a single compressed representation for any given value of QP that can be decoded, at least approximately (e.g., subject to round off errors), at any desired bit depth. With this invention, it no longer necessary to have different bitstreams that are incompatible because of bit depth. By standardizing the effects of QP, two decoders at different bit depths perform the identical calculations but with differing precision. Without this standardization, decoders require determining the meaning of QP with respect to the bit depth of the encoder versus the bit depth of the decoder.

Another aspect of the invention is that one may encode the image or video input at its native (original) bit depth and decoding may take place at whatever bit depth is desired or possible. While this may result in small drift between an N-bit decoding and an M-bit decoding if the decoded bit depth is greater than the encoded bit depth, such drift may not be noticeable for common coding situations.

The invention is designed so that the rate-distortion performance of a compression system is independent of the bit depth of the data that is encoded. Therefore, the rate-distortion performance at a given QP should be the same (within the limits of round-off error) regardless of bit depth. This is achieved by normalizing the quantization step-size, QS, to the most significant bit of the data to be encoded. Thus the quantization step-size, QS, is a function of both the quantization parameter, QP, and the number of bits used in data being encoded as shown in FIG. 6.

DETAILED DESCRIPTION OF THE INVENTION

Figure 1:
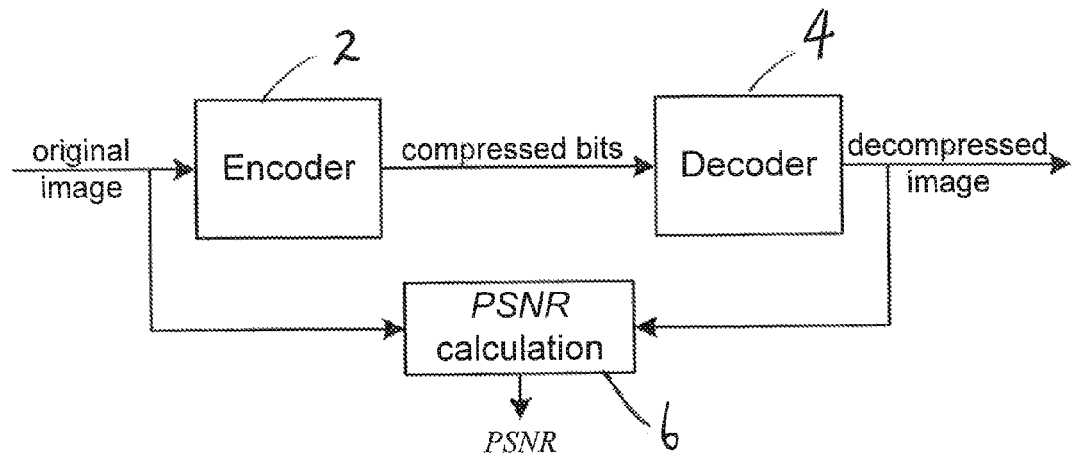
FIG. 1 shows schematically a generic prior art image compression/decompression system.

In a preferred embodiment, a quantization parameter, QP, determines the quantization step-size, QS. In order to achieve QP invariance as bit depth changes, it is necessary to normalize QS with respect to the most significant bit of the input data sample bit depth. If a given QP maps to a quantization step-size $QS_8$ for 8-bit samples, then the resulting quantization step-size for N-bit samples is $$QS_N = QS_8 \times 2^{N-8} \quad (7)$$

so that the basic quantization equation for N-bit samples $$Q = \text{int}[X/QS_N + r] \quad (8)$$

becomes $$Q = \text{int}[X \times 2^{8-N}/QS_8 + r] \quad (9)$$

Then dequantization for M-bit samples $$X' = Q \times QS_N + s \quad (10)$$

becomes $$X' = 2^{M-8} \times Q \times QS_8 + s \quad (11)$$

Note that the implementation of these changes simply requires additional shift operations with respect to the operations on 8-bit data. Although equations 7 through 11 may be expressed more generally, they are expressed with respect to an 8-bit reference because 8-bit bit depths have been common heretofore.

Figure 6:
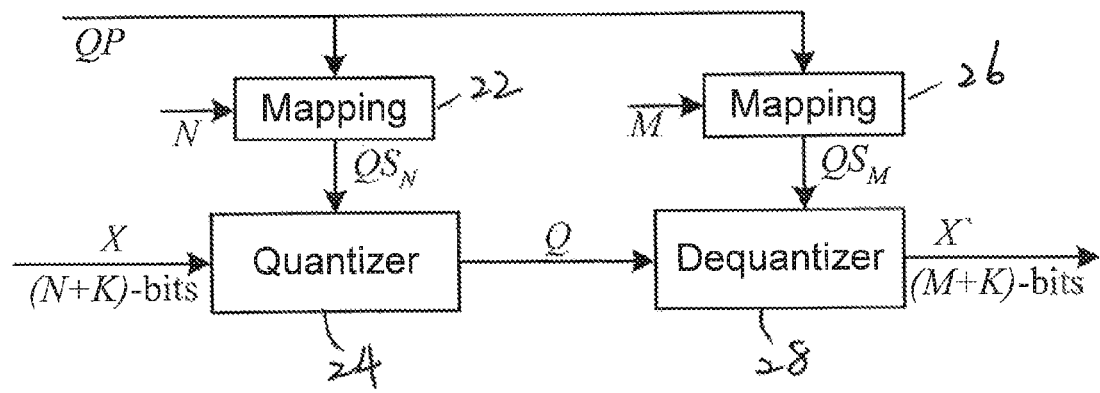
FIG. 6 shows schematically a generic quantization and dequantization system in accordance with aspects of the present invention.

FIG. 6 shows schematically a generic quantization and dequantization system in accordance with aspects of the present invention. The quantization parameter QP is applied to a first mapping function 22 that generates a quantization step-size $QS_N$ in accordance with predetermined QP to QS mapping relationships and a bit depth N. The quantization step-size $QS_N$ is determined in accordance with equation 7 (above). N+K is the bit depth of the (N+K)-bit data words X applied to quantizer 24 that quantizes the X data words in accordance with step-size $QS_N$ to produce quantized data words Q having a bit length that is a function of QP, as discussed further below The same QP value is also applied to a second mapping function 26 that generates a quantization step-size $QS_M$ in accordance with the same predetermined QP to QS mapping relationships but in response to a bit depth M that may be different from the bit depth N to which mapping 22 is responsive. Bit depth M+K is the bit depth of the (M+K)-bit data words produced by dequantizer 28. The dequantization step size $QS_M$ is determined in accordance with equation 7 (above). Dequantizer 28 receives the quantized data words Q and produces (M+K)-bit data words X' that approximate the X data words.

Figure 2:
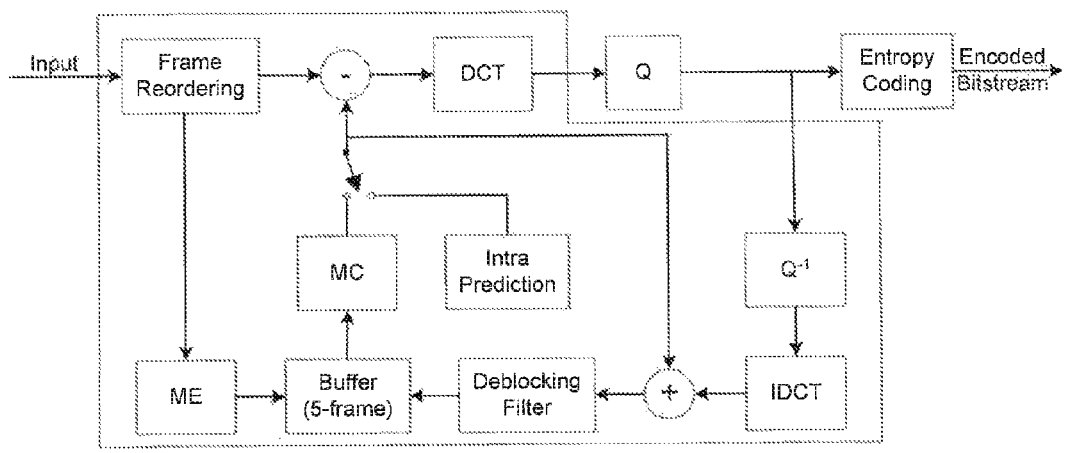
FIG. 2 shows a block diagram for an H.264 encoder.
Figure 3:
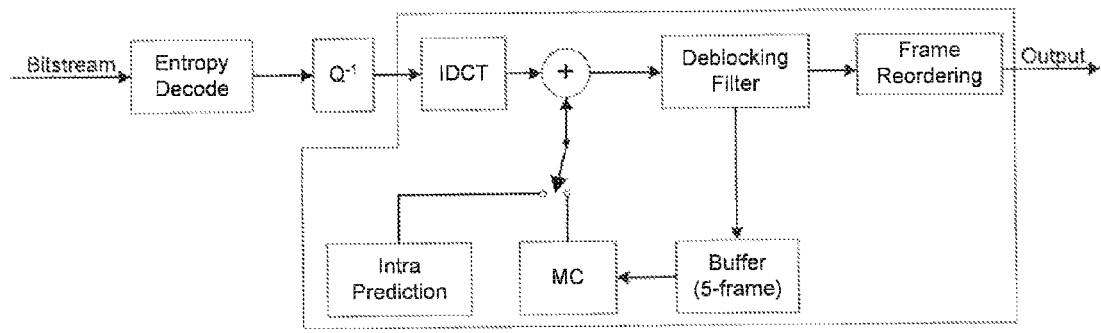
FIG. 3 shows a block diagram for an H.264 decoder.
Figure 4:
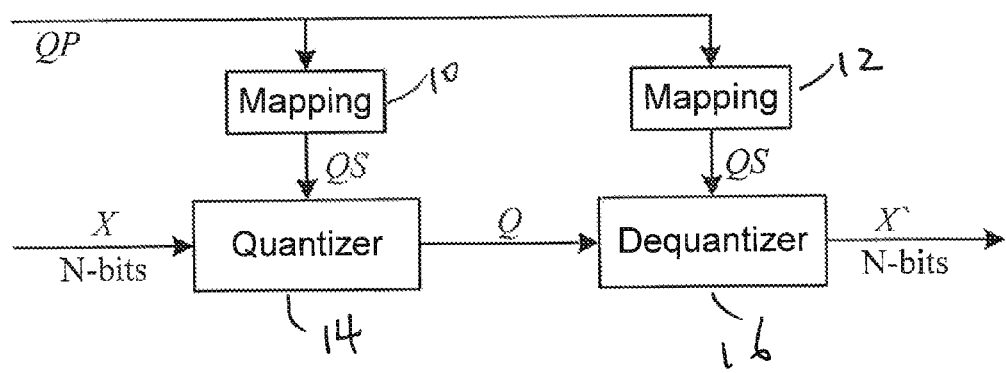
FIG. 4 shows prior art in quantization and dequantization.
Figure 7:
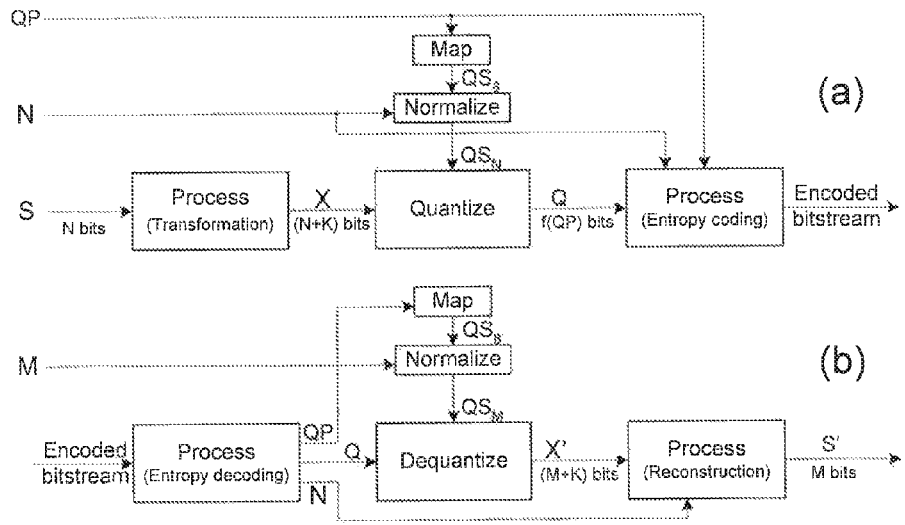
FIGS. 7(*a*) and 7(*b*) show schematically a generic depiction of a video encoder and decoder, respectively, showing how quantization and dequantization aspects of the present invention may be employed in such encoders and decoders.

FIG. 7 shows schematically a generic depiction of a video encoder and decoder, such as the H.264 encoder and decoder shown in FIG. 2 and FIG. 3, showing how quantization and dequantization aspects of the present invention may be employed in such encoders and decoders. For the encoder of FIG. 7(*a*), the block labeled "Process (Transformation)" transforms the input samples into the variables to be quantized. This block corresponds generally to the portion of FIG. 2 enclosed by the dashed lines. The block labeled "Process (Entropy coding)" assembles an encoded bitstream after entropy coding the quantized variables. Similarly, for the decoder in FIG. 7(*b*), the block labeled "Process (Entropy decoding)" parses encoded bitstream and entropy decodes the entropy-coded quantized variables. The block labeled "Process (Reconstruction)" reconstructs the output samples from the decoded and dequantized variables and corresponds generally to the portion of FIG. 3 enclosed by the dashed line.

The encoder shown in FIG. 7(*a*) receives input symbols S of N bits and transforms them into a sequence of variables X having N+K bits where K is a function of the "Process (Transformation)" block and is typically greater than zero. The encoder is also provided with a QP value and the bit depth N of the input symbols S. Each variable X is quantized by a quantizing step-size $QS_N$ appropriate for a sample bit depth of N. $QS_N$ is determined by a mapping from QP to $QS_8$ followed by the normalization given by equation 7. The resulting quantized variables are entropy coded and combined with N, QP and other parameters to produce an encoded bitstream. In practice, QP needs to be sent in the bitstream only when it changes. Sending N is useful for indicating that drift reduction is required if M<N or that emulation of lower precision arithmetic in the decoder is required if M>N. N is required to indicate the number of additional values of QP may be required. The encoded bitstream is decoded by the decoder shown in FIG. 7(*b*) to yield the original N, QP, additional parameters and the quantized variables Q. In the decoder, these quantized variables are dequantized with a quantization step-size $QS_M$ appropriate for M bit samples of the desired output. $QS_M$ is derived analogously to $QS_N$ using a mapping from QP to $QS_8$ followed by the normalization to M bits given by equation 7. The final output S' is thus an M-bit approximation to the N-bit samples S in the original image.

Fully utilizing the capabilities of greater bit depths requires smaller values for the quantization step-size, QS. To achieve the improved quality (the higher PSNR shown in Table 1) possible with greater bit depths while maintaining QP invariance requires not only the retention of existing values for QS but also requires additional values for QP to indicate the newly added finer values for QS. Retaining the existing values of QS may also require newly added intermediate values of QP, as is explained further below.

The prior art, by normalizing the quantization with respect to the least significant bit, adds finer quantization step-sizes at the expense of losing coarser values of QS as shown in Table 3. The example of Table 3 pertains to identity mapping in which QP=QS. While the quantization step-sizes are the same with respect to the LSB for 8-bit and 10-bit bit depths ($QS_8$ and $QS_{10}$ are the same value as QP for both bit depths in the case of LSB normalization), they are not with respect to the MSB (for example, $2^{-8}$ for $QS_8$ and $2^{-10}$ for $QS_{10}$ for QP=1 in the case of MSB normalization). Thus the quantization step-sizes for 10 bits have additional fine values for QP=1,2,3, but sacrifice all the quantization step-sizes larger than $2^{-5}$ with respect to the MSB.

TABLE 3

Prior art quantization for identity mapping

| QP | $QS_8$ LSB (MSB) | $QS_{10}$ LSB (MSB) |
|---|---|---|
| 1 | 1 ($2^{-8}$) | 1 ($2^{-10}$) |
| 2 | 2 ($2^{-7}$) | 2 ($2^{-9}$) |
| 3 | 3 | 3 |
| 4 | 4 ($2^{-6}$) | 4 ($2^{-8}$) |
| ... | ... | ... |
| 8 | 8 ($2^{-5}$) | 8 ($2^{-7}$) |
| ... | ... | ... |
| 16 | 16 ($2^{-4}$) | 16 ($2^{-6}$) |
| ... | ... | ... |
| 32 | 32 ($2^{-3}$) | 32 ($2^{-5}$) |

For this invention, the manner in which these new quantization step sizes are added depends on the mapping from QP to QS introduced previously in equations (5) and (6).

In the case of the identity mapping $$QS = QP \qquad (12)$$

used in MPEG-2 and elsewhere this means that QP should now indicate additional values for QS in order to exploit more fully the benefits of greater bit depths. For example, suppose that for 8-bit bit-depth, input samples the values for QP are the integers $\{1, 2, 3, 4 \ldots K\}$ and therefore the values for QS are simply the same integers $\{1, 2, 3, 4 \ldots K\}$. The quantization step-sizes for 10 bits that achieve QP invariance (for the original values of QP) are then the intermediate QS values $\{4, 8, 12, 16 \ldots 4 \times K\}$. This skips over the integers up to and between those values, i.e., $\{1, 2, 3, 5, 6, 7, 9, 10, 11 \ldots 4 \times K-2, 4 \times K-1\}$. Thus, to have all the possible integer quantization step-sizes at 10-bits (i.e., all of the original step sizes and all of the new finer step sizes), QP requires two extra "fractional" bits to indicate the values $\{¼, ½, ¾, 1, 1¼, 1½, 1¾, 2, \ldots, K-¼, K\}$. An example of such a relationship between QP and QS at bit depths of 8 and 10 that achieves QP invariance is shown in Table 4.

TABLE 4

QP, and QS at 8 and 10 bits for identity mapping to achieve QP invariance

| QP | $QS_8$ | $QS_{10}$ |
|---|---|---|
| ¼ | ¼ | 1 |
| ½ | ½ | 2 |
| ¾ | ¾ | 3 |
| 1 | 1 | 4 |
| 1¼ | 1¼ | 5 |
| ... | ... | ... |
| K − ¼ | K − ¼ | 4 × K − 1 |
| K | K | 4 × K |

The case of identity mapping requires determining the number of fractional and integer bits in QP. One way to achieve this is to send the input bit depth, N, in the compressed bitstream. The number of fractional bits in QP (and hence QS) is simply N−8.

The following two examples illustrate the quantization method according to aspects of the present invention for the case of identity mapping. Table 5 compares the coding of 10-bit data and the same data rounded to 8-bits at QP=1 to show that the results agree as one would expect. In practice, one would not have to make a separate encoding at 8 bits, instead, one could encode at 10 bits and then decode at 8 or 10 bits. For a given value of QP, the quantization step-size, QS, changes with bit depth according to Equation (7). X is the data to be quantized, which, in this example, has two more bits than the input data, i.e., K=2. Thus, what is referred to herein as the "8-bit X" has 10 (=N+K) bits. The 8-bit X is the 10-bit X rounded to 8 bits. Note that the quantized values Q are exactly the same because they are a function of QP (in this example, a QP of 1 results in a quantized bit length of 10 bits regardless of the bit depth). It is the equality, within rounding error, of the quantized values Q that unifies operation for a given value of QP at different bit depths, allowing the bitstreams for different bit depths to be compatible for a given value of QP. Note that the dequantized values X' are the same to within the rounding error (interpreting the 2 least significant bits of the 10-bit version as fractional bits when comparing to the 8-bit version). Thus, substantially the same quality results at different bit depths when QP has the same value at the different bit depths.

TABLE 5

Comparing 8 and 10 bit encoding and decoding

| Variable | 8-bit encoding and decoding | 10-bit encoding and decoding |
|---|---|---|
| QP | 1 | 1 |
| QS | 1 | 4 |
| X | 0001110101 | 000111010011 |
| Q | 0001110101 | 0001110101 (assuming r = ½) |
| X' | 0001110101 | 000111010100 |

Table 5 example shows that the quantized values, Q, always have the same scale regardless of bit depth for a given QP. This makes 8-bit and 10-bit compressed bitstreams nearly identical in content, differing only to the extent of any rounding error. The respective bitstreams resulting from the same QP value thus may be identical in syntax and semantics even though they represent different encoded bit depths.

The second example, in Table 6, compares 8- and 10-bit decoding at a QP of ¼, assuming an enhanced 8-bit decoder that can accept fractional QPs. In this case X' differs by rounding error as one would expect.

TABLE 6

Comparing 8 and 10 bit decoding

| Variable | 8-bit decoding | 10-bit encoding and decoding |
|---|---|---|
| QP | ¼ | ¼ |
| QS | ¼ | 1 |
| X | ... | 000111010011 |
| Q | 000111010011 | 000111010011 |
| X' | 0001110101 (assuming s = ½) | 000111010011 |

Overall, the differences in dequantized values X' are within rounding error (Table 1). As in the Table 5 example, the number of bits required for the quantized values, Q, is a function of QP, but not bit depth. Such results are due to the scaling for QS given in Equation 7 and are true independent of the mapping from QP to QS. In the Table 6 example, QP has a lower value, resulting in the potential of a higher quality decoded X' (Q is 10 bits rather than 8 bits as in the Table 5 example, allowing a 10-bit decoding (or, if desired, an 8-bit decoding with a loss of resolution). For the case of 8-bit decoding, it is assumed that the encoder receives an input X having a bit depth of 10 bits (or more) in order to obtain a 10-bit quantized value Q in which the last two least significant bits are not zero.

Figure 5:
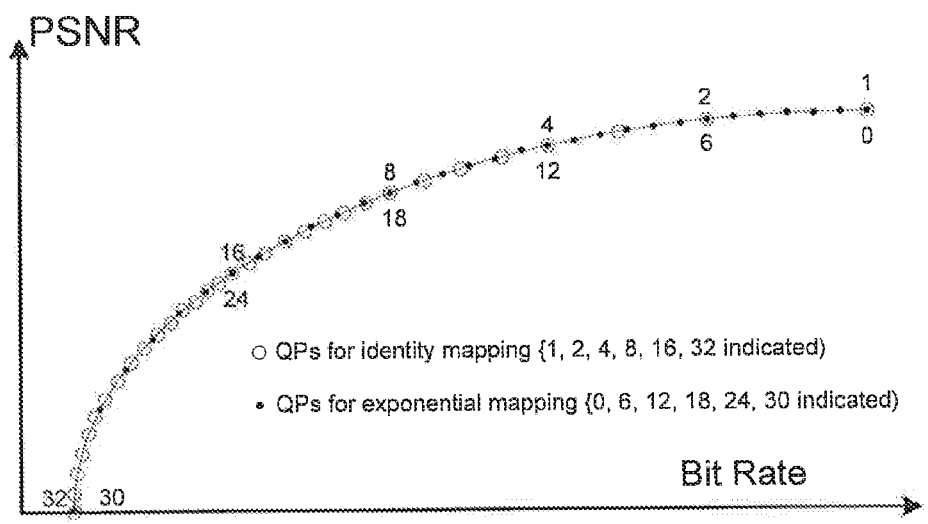
FIG. 5 shows a rate-distortion curve.
Figure 8:
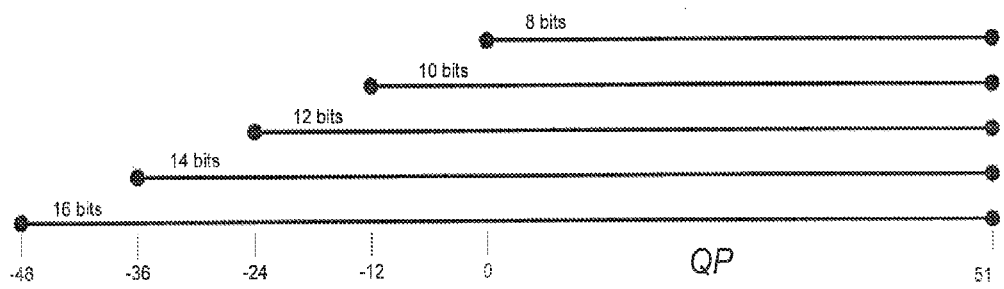
FIG. 8 shows schematically how higher bit depths add more negative values for QP.

For the case of the exponential mapping used in H.264, $$QS = 2^{QP/6-L} \qquad (13)$$

making it necessary only to extend the range of QP in the negative direction. The values for QP remain integers although they are now signed. Because of the QP/6 in the exponent, every additional bit of sample bit depth allows the minimum value for QP to decrease by 6. Thus if the QP range for 8 bits is, say, [0, 51] then the QP range for 10 bits would be [−12, 51]. In addition to QP remaining an integer, this mapping allocates QP values more efficiently than the identity mapping as was described earlier and shown in Table 2 and FIG. 5. Higher bit depths enable higher quality, which occurs at lower values of QP. The exponential mapping adds all these additional QP values in this range. FIG. 8 shows schematically how higher bit depths add more negative values for QP. We can now see why the exponential mapping provides a more efficient framework in which to add these new QP values. In going from 8 to 10 bits, the identity mapping requires two extra bits to represent QP but only adds three values, $\{1/4, 1/2, 3/4\}$, of smaller quantization step-sizes, with the other additional values filling in between existing QP values, most of which are at high QP (low quality) values. In contrast, with the exponential mapping each additional bit of sample depth adds six smaller QP (and QS) values. Thus, going from 8 to 10 bits adds 12 finer QS values for the exponential mapping while the identity mapping adds only 3. Furthermore, it requires fewer bits to signal these additional QP values. Using just one extra bit (the sign bit) in the representation of QP is sufficient to handle a bit depth of 16 bits.

These changes enable the possibility of compatible compressed bitstreams. Once the effects of bit depth are properly accounted for, the compressed representation is essentially independent of bit depth. That is, all control elements of the stream (such as QP) are exactly the same. Numerical elements (such as quantized values, like Q) are the same to within round-off error. Informational elements (such as the bit depth, N) can differ. Consequently, decoders of differing bit depths simply use more or less precision in their calculations. Examples of decoding at bit depths greater than encoded bit depths are give in United States Patent Publication US 2002/0154693 A1, of Gary A. Demos et al, published Oct. 24, 2002. Said Demos et al application is hereby incorporated by reference in its entirety.

Figure 9:
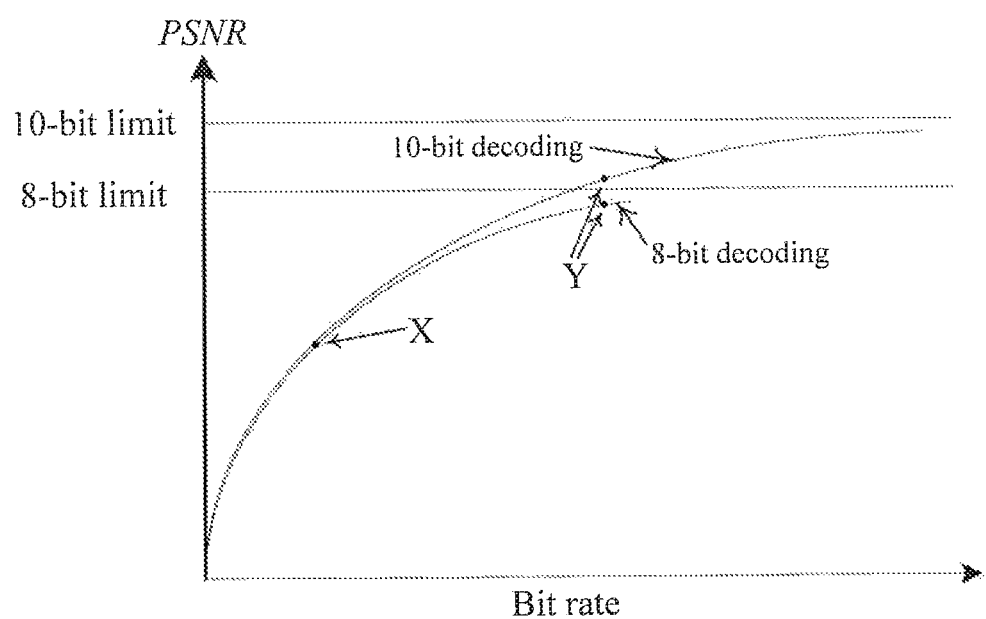
FIG. 9 shows a rate-distortion curve.

The rate-distortion curve in FIG. 9 illustrates a fundamental principle—that QP determines the overall system performance within the constraints of the encoding and decoding bit depths. That is, QP, which represents the quantization of the compressed data is the dominant controller of quality, while the bit depth, which represents the quantization of the input and output samples, only determines whether or not the best performance possible for a given QP is achieved. The operating point indicated by "X" is at one QP and the two indicated by "Y" are at a different and smaller QP. The QP indicated by X yields essentially the same performance regardless of bit depth. Conversely, the performance at the QP indicated by Y is a case where the QP is so low that 10 bits are required to achieve the best possible PSNR.

Thus, it becomes possible, for example, to encode data at its original or native (i.e., highest) bit depth, and then decode at any desired bit depth. In this way, the original bit depth limits the quality of the decompressed result, the decompressed bit depth, and the compressed bit rate in an optimal way.

FIG. 9 shows the resulting behavior. In this case, the original source material has a bit depth of 10 bits. This is encoded according to aspects of the present invention. This bitstream can then be decoded at both the original 10 bits, as well as an approximate version at 8 bits. Note that at low bit rates the R-D curves for both cases are nearly identical. Then, as the rate-distortion curves approach the round-off threshold for 8 bits (~59 dB as shown in Table 1), the 8-bit curve begins to fall away leaving only the 10-bit curve to achieve the higher PSNRs. The more limited range of QP values at 8 bits causes its curve to terminate at lower PSNR and bit rate.

As mentioned above, as 8-bit decoding of some quantized value differs only from the corresponding 10-bit decoding by round-off error. This round-off error can accumulate from prediction to prediction, i.e. P-frames. This error results in a MSE between the 8-bit and 10-bit decodings, which is known as drift. This drift typically is neither noticeable nor objectionable in normal practice (i.e. I-frame spacing). In the case where the decoded bit depth, M, is greater than the input (encoding) bit depth, N, the resulting drift can be eliminated by sending N in the bitstream, and then emulating the coarser arithmetic of an N-bit decoder.

Implementation

The invention may be implemented in hardware or software, or a combination of both (e.g., programmable logic arrays). Unless otherwise specified, the algorithms included as part of the invention are not inherently related to any particular computer or other apparatus. In particular, various general-purpose machines may be used with programs written in accordance with the teachings herein, or it may be more convenient to construct more specialized apparatus (e.g., integrated circuits) to perform the required method steps. Thus, the invention may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described. Accordingly, other embodiments are within the scope of the following claims.

We claim:

1. A method of processing an encoded bitstream of digital symbols representing a moving image, the encoded bitstream is entropy encoded by an encoder, the encoder identifying a bit depth M, the method comprising:
   receiving, by a decoder, the bitstream, the bitstream including a quantization parameter QP, quantized digital symbols, and data identifying the bit depth M; and
   determining a quantization step size $QS_M$ for the bit depth M, the quantization step size $QS_M$ equaling $2^{(M-8)}*QS_8$ when the bit depth M is greater than 8,
   wherein $QS_8$ is a quantization step size for the bit depth of 8 according to the quantization parameter QP, and
   wherein $QS_8$ is proportional to $2^{QP/6}$.

2. The method of claim 1, wherein the bit depth M equals 10, 12, 14 or 16.

3. The method of claim 1, wherein $QS_8$ is determined by using the quantization parameter QP value to index a table of values.

4. The method of claim 1, wherein the quantized digital symbols result from truncation.

5. The method of claim 1, wherein the quantized digital symbols result from simple rounding.

6. A device comprising:
   (i) hardware that receives an encoded bitstream, the encoded bitstream including a quantization parameter QP, quantized digital symbols, and data identifying a bit depth M; and
   (ii) hardware that determines a quantization step size $QS_M$ for the bit depth M, the quantization step size $QS_M$ equaling $2^{(M-8)}*QS_8$ when the bit depth M is greater than 8,
   wherein $QS_8$ is a quantization step size for the bit depth of 8 according to the quantization parameter QP, and
   wherein $QS_8$ proportional to $2^{QP/6}$.

7. A method of processing an encoded bitstream of digital symbols representing a moving image, the encoded bitstream is entropy encoded by an encoder, the encoder identifying a bit depth, the method comprising:
   receiving, by a decoder, the bitstream, the bitstream including data identifying a quantization parameter QP, quantized digital symbols, and data identifying the bit depth; and
   determining a quantization step size QS for the bit depth, the quantization step size QS determined from $2^{QP/6-L}$, L being a constant that differs for dequantizing luma values versus chroma values,
   wherein a syntax range of the quantization parameter QP extends to a negative integer value.

8. The method of claim 7 wherein a minimum of the syntax range of the quantization parameter QP equals (the bit depth−8)*(−2).

9. The method of claim 7 wherein the bit depth equals 8.

10. The method of claim 7 wherein a maximum of the syntax range of the quantization parameter QP is 51.

* * * * *